United States Patent
Karmarkar et al.

(10) Patent No.: US 10,534,674 B1
(45) Date of Patent: Jan. 14, 2020

(54) SCALABLE, PERSISTENT, HIGH PERFORMANCE AND CRASH RESILIENT METADATA MICROSERVICE

(71) Applicant: EMC IP Holding Company LLC, Hopkinton, MA (US)

(72) Inventors: Atul Avinash Karmarkar, San Jose, CA (US); Philip Shilane, Newtown, PA (US); Venkata Ravi Chandra Bandlamudi, San Jose, CA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 16/032,960

(22) Filed: Jul. 11, 2018

(51) Int. Cl.
*G06F 3/06* (2006.01)
*G06F 11/14* (2006.01)
*G06F 12/0815* (2016.01)
*G06F 12/0864* (2016.01)
*G06F 16/174* (2019.01)

(52) U.S. Cl.
CPC ...... *G06F 11/1471* (2013.01); *G06F 11/1453* (2013.01); *G06F 12/0815* (2013.01); *G06F 12/0864* (2013.01); *G06F 16/1748* (2019.01); *G06F 3/067* (2013.01)

(58) Field of Classification Search
None
See application file for complete search history.

(56) References Cited

U.S. PATENT DOCUMENTS

2010/0153375 A1* 6/2010 Bilas .......... G06F 16/1744 707/723
2019/0245918 A1* 8/2019 Xu .............. G06F 16/1744

* cited by examiner

*Primary Examiner* — Brian R Peugh
(74) *Attorney, Agent, or Firm* — Barry N. Young (57) ABSTRACT

In a deduplicated microservices-based storage system and method running in a cloud includes frontend and backend microservice nodes that process requests from a plurality of clients and interface with a master node and one or more worker nodes connected as a network for deduplicating, storing and retrieving data from object storage, a worker node receives queries and fingerprints for data segments of a data similarity group to be deduplicated, obtains and returns the similarity group from its cache or from object storage using a key. The system compares the received fingerprints to stored fingerprints to determine non-duplicates for deduplication. The worker node updates similarity groups in its cache and in a write-ahead log with a reference to a compression region of non-duplicate segments, and periodically writes modified objects from its cache to object storage.

20 Claims, 10 Drawing Sheets

UpdateSimGp RPC

Figure 7B

GetHighestSubgroupID RPC

Figure 7D

FindNonDups RPC

Figure 7A

GetCompressionRegions RPC

SCALABLE, PERSISTENT, HIGH PERFORMANCE AND CRASH RESILIENT METADATA MICROSERVICE

BACKGROUND

This invention relates generally to microservices systems and methods, and more particularly to an architecture for metadata microservices for deduplication and storage of object data in large storage systems.

Microservices refers to an architectural style that structures applications as a collection of loosely coupled collaborating services which run in separate containers to implement a business capability. These services are built around the business capability, are independently deployable, and the architecture is characterized by a minimum of centralized management. The microservice architecture enables the continuous delivery/deployment of large, complex applications. It also enables an organization to evolve its technology easily according to needs. Microservices is an architecture that is particularly suitable for deployment in a distributed environment. One example of a business capability for which microservices is especially useful is the distributed deduplication of data to maximize the efficient utilization of storage resources in large data storage systems.

Deduplication involves determining whether data to be stored is unique or is a duplicate of previously stored data. A deduplication process segments an incoming data stream, creates metadata that uniquely identifies data segments, such as fingerprints, and then compares the fingerprints to those of previously stored data segments. If the segment is unique, it is stored on disk. However, if an incoming data segment is a duplicate of what has already been stored, a reference may be created to it and the segment is not stored again. Using fingerprints avoids the need to compare larger data segments. This conserves storage resources, reduces costs and increases performance. Thus, metadata creation, storage and processing are important to deduplication.

Key needs for a deduplicated storage system of a large organization are that the system be able to scale resources based upon demand, has a fast response to queries and metadata updates, maintains persistent state across node crashes, and has low cost. Scalability is important because the load in large distributed systems varies, and the cost of resources is not insignificant. Crash resiliency requires that state be maintained persistently for recovery. Optimum use of resources and high performance requires an architecture in which resources are coordinated and orchestrated. While there are existing databases that can scale, they do so based upon specific capacity, not based upon demand. Thus, they are not flexible in adapting to changing conditions. Moreover, few, if any, known systems have an architecture in which resources are orchestrated or are able to satisfy the requirements of fast response, persistence across node crashes, and low cost.

There is a need for systems and methods that address the foregoing and other problems with known deduplication systems and methods, and it is to these ends that the present invention is directed.

DESCRIPTION OF PREFERRED EMBODIMENTS

Data Domain, an entity of Dell EMC the assignee of the invention, is developing a deduplicated microservices-based storage system in which components run in containers and can scale up and down as needed. The system is particularly well adapted to a cloud environment, such as Amazon Web Services ("AWS"), Google Cloud, and Microsoft Azure, to name a few, and will be described in that context. As will be appreciated, however, this is illustrative of only one utility of the invention and it has applicability in other contexts and to other types of systems.

The cloud components of the system and processes include metadata microservices that may run in an underlying orchestration layer, such as Kubernetes, as will be described. The invention has several novel aspects that contribute to achieving the objectives of the invention discussed above and which are particularly well adapted to run as a cloud-based application. Embodiments of these aspects will be described in that context.

In overview, and as will be described in more detail, an incoming data object from a client is sent to a frontend node, which forms slices having a preselected size of approximately 8 MB (megabytes), for example, where each slice comprises approximately one thousand segments, each having a size of approximately 8 KB (kilobytes), and may distribute the slices to a plurality of backend nodes for processing. If a client chooses to perform a multi-part upload, where the object is transferred to the system in multiple parts, each part may be handled by a different front end node. A unique fingerprint, e.g., a hash, may be calculated for each segment. To perform deduplication, each slice may be mapped to a similarity group, which may have many identical stored segments. As used herein, a similarity group is a data structure containing a list of descriptors of compression regions comprising compressed segments and a list of corresponding fingerprints for each compression region. Similarity groups and compression regions may be persisted in object storage. The fingerprints of the segments of the incoming slice are calculated and compared to the stored fingerprints of the segments of a similarity group. Fingerprints that match stored fingerprints are marked as duplicates. Fingerprints that are unique (non-duplicates) represent new segments which must be stored.

As described below, the deduplication system may include a metadata microservices subsystem comprising a master node ("master") and a cluster of one or more worker nodes ("workers"). In one aspect, the invention affords a scalable system architecture running in an underlying orchestration layer, such as Kubernetes, where system components such as workers dynamically scale up and down based upon demand. As the workers scale, the master re-partitions the metadata space across the cluster of workers using consistent hashing (to be described), maintains state information, and coordinates changes to the workers. Each worker is responsible for persistently storing similarity group data and metadata in object storage for, and for managing access to similarity groups in a particular range of identity values assigned by the master. The range assigned to each worker is varied as worker resources are scaled. Workers are also responsible for responding to queries from other nodes of the system, and for performing deduplication of data in similarity groups within their assigned ranges, and handling crash recovery In other aspects, for fast response, the workers may have an in-memory read/write cache that services most requests such as queries for similarity groups from processing frontend and backend system nodes that create the slices and segments. For long term persistence, the system preferably uses object storage because of its low cost and high reliability. For persistence and fast response for incremental updates to distributed metadata, workers may also use a write-ahead log (WAL) to store updates before they are stored to object storage. The workers also determine whether incoming fingerprints are unique or duplicates for deduplication of associated segments by comparing the incoming fingerprints to stored fingerprints.

Figure 1:
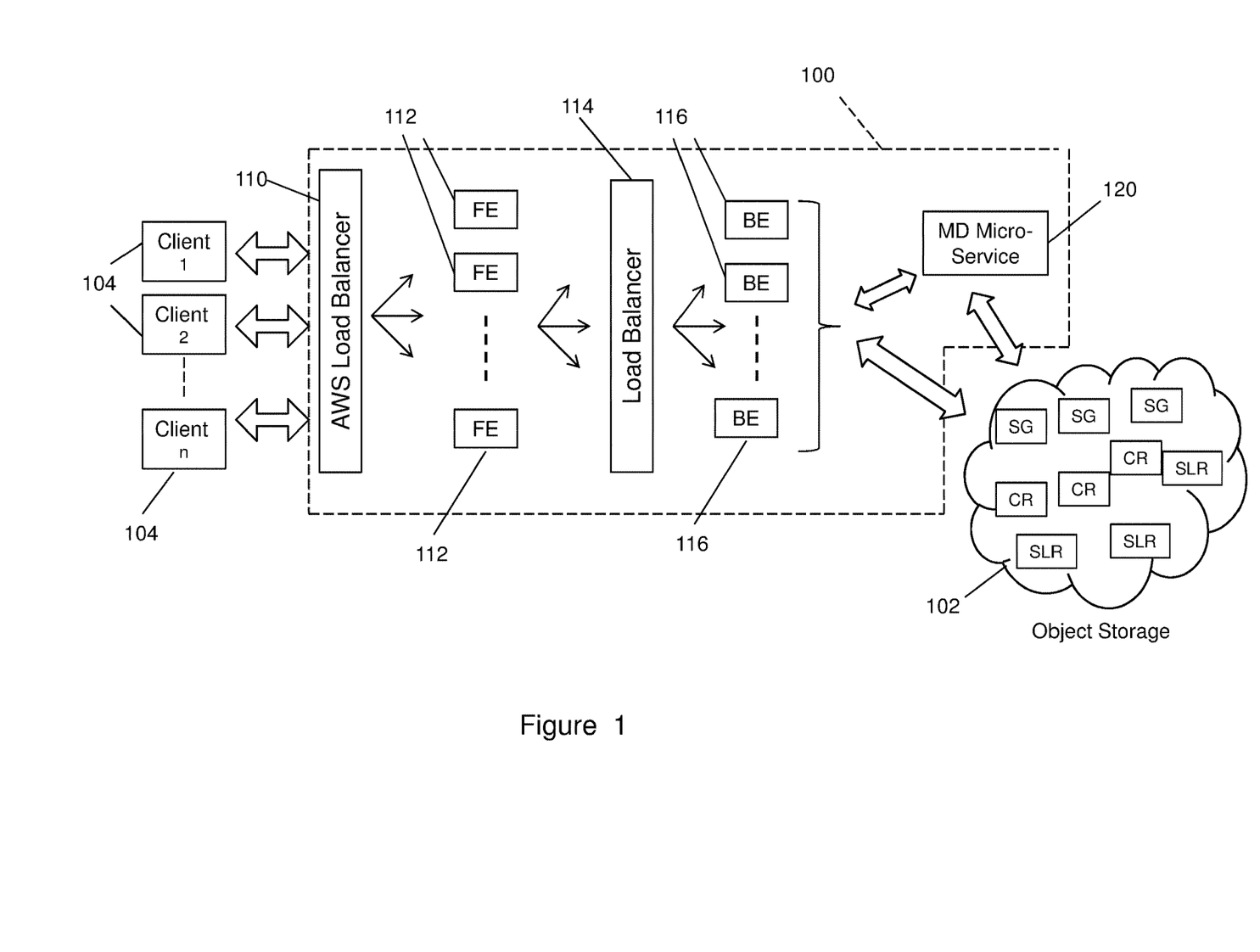
FIG. 1 is a diagrammatic view illustrating an embodiment of a deduplicated microservices-based storage system in accordance with the invention.

FIG. 1 is a diagrammatic view of an embodiment of a system in accordance with the invention for deduplicating and storing data. As shown, the system may comprise microservices that run in an open source cloud orchestration layer 100, such as Kubernetes (as mentioned), and interface to persistent object storage 102 and to a plurality of clients 104. The clients submit queries and requests for data to the microservices in the orchestration layer 100 and data for storage in the object storage 102. The clients may comprise various types of data producers and consumers including computing devices such as, for example, mobile phones, computers, or servers. Clients may be running in a public and/or a private cloud, as on a virtual machine or in a container.

In an embodiment, the microservices, the orchestration layer, the object storage and other resources preferably operate in the cloud environment, such as in AWS. These resources may comprise an AWS load balancer 110 that receives an object (or part of a multi-part upload) from a client and supplies the object to a frontend node of frontend microservices comprising a plurality of frontend nodes 112. The frontend node forms data slices of approximately 8 MB. The frontend node may supply the data slices and slice recipes comprising a listing of the slices in each data slice to another load balancer 114. The load balancers distributes the slices and slice recipes to a plurality of backend nodes 116. The backend nodes divide each data slice into non-overlapping segments of approximately 8 KB and calculate corresponding fingerprints for the segments. The fingerprints may be hashes of the data segments. The backend nodes supply the fingerprints to a metadata microservice (MD MicroService) subsystem 120. The frontend and the backend nodes may comprise computing devices (processors) having associated memory storing instructions for controlling the computing devices to perform the operations described herein.

As will be described in more detail, the metadata worker nodes (workers) of the metadata microservice subsystem are responsible for managing access to similarity groups for deduplication and for restoring objects. They compare fingerprints of the incoming segments to the segment fingerprints of a corresponding similarity group (SG), which may be stored in object storage 102, and return for each fingerprint a response of either "duplicate" or "unique", i.e., non-duplicate. If the fingerprints are unique (non-duplicates), the backend node forms a compression region comprising a data structure that lists the corresponding segments and their fingerprints, and stores the compression region (CR) in object storage 102. Object storage 102 may also have store slice recipes (SLR), as shown.

Due to the nature of deduplication, multiple slices within the same or different files may refer to the same similarity group. For crash resiliency, state must be maintained persistently. The number of similarity groups may be in the range of billions and, as such, they will not fit into the memory of single node. It is not practical to spawn multiple nodes and keep all of the similarity group data in memory because backup data load is infrequent and there is no guarantee that all the similarity groups will be accessed for each workload. Provisioning a dedicated key-value cluster is also not practical for backup cluster resources running in a cloud because of poor resource utilization and because of the provisional costs of cloud computing and storage (particularly block storage) resources. Thus, the system of the invention auto-scales key-value microservices based on number of requests (demand) for key (similarity group identifier) to value (similarity group) mappings, and stores the similarity groups (SG) in persistent storage. Object storage is used for persistent storage rather than block storage because object storage is less expensive, more reliable, and infinitely scalable.

Kubernetes allows nodes of the orchestration layer to scale up or down, and restarts crashed nodes. The invention utilizes this capability to scale nodes by controlling Kubernetes using a unique metric based upon demand to scale nodes as needed, as will be described, to lower costs and improve responses.

Metadata Microservice Orchestration

Figure 2:
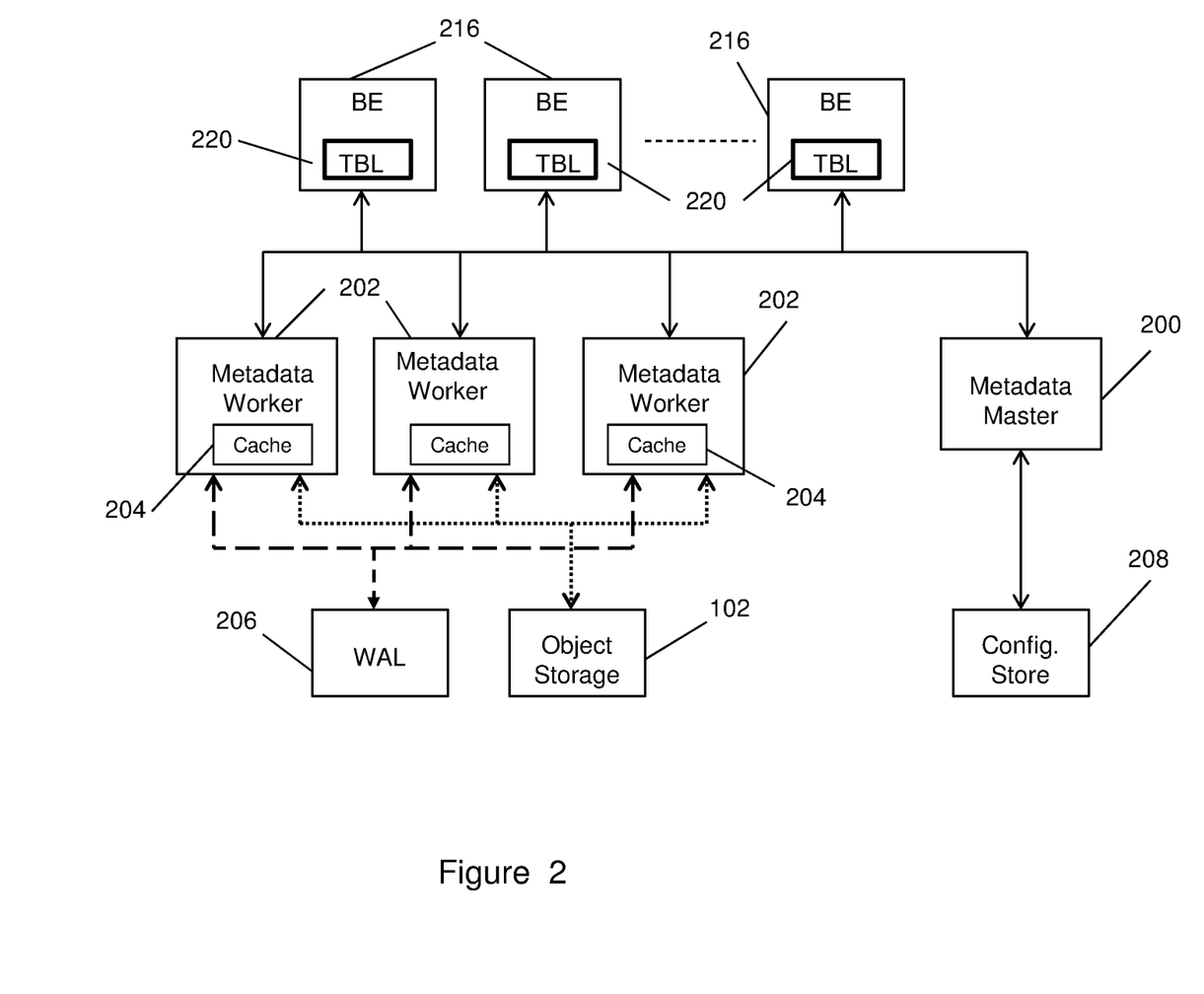
FIG. 2 is functional block diagram of an embodiment of a metadata microservices subsystem in accordance with the invention of the system of FIG. 1.

A significant part of the storage system of FIG. 1 for deduplication is the metadata microservice (MD MicroService) subsystem 120. This subsystem affords the characteristics and functionality that principally address the problems of resource scaling according to demand, fast response, persistence across nodes during crashes, and low cost. FIG. 2 is a functional block diagram of an embodiment of a metadata microservice subsystem in accordance with the invention.

Referring to FIG. 2, the metadata microservice subsystem may comprise a metadata master node ("master") 200 and a plurality of metadata worker nodes ("workers") 202 connected together in a network with the master 200. Each worker has a different IP address. Although only three workers are shown in the figure, it will be appreciated that the number of workers may be greater or fewer than shown, and, as will be explained, the number of workers may be dynamically scaled by the master as needed based upon demand. The network of master and workers may be connected to a plurality of backend nodes 216. Each worker 202 may have an in-memory read/write cache 204 (for purposes to be described), and the workers may be connected to object storage 102, as shown. Each worker may also be assigned by the master a separate portion of a write-ahead log (WAL) 206 (for reasons that will also be described), which may be provided by AWS. The master 200 may have a configuration store 208, which may comprise "etcd" key-value storage added as a POD to Kubernetes, for persistently storing state information for crash recovery. All of the nodes of the system and the MD MicroService subsystem may run as separate microservices in the Kubernetes orchestration layer. The advantages of separating nodes and other components into their own microservice are the ability to scale independently, simpler implementation, and independent upgrades.

The master node 200 has several important functions. It coordinates the operations of and changes to worker nodes, and it maintains state and responds to events within the working node cluster such as crash recovery. Additionally, as Kubernetes scales to increase or decrease the number of workers based upon demand, the master partitions the ranges of similarity group ID values across the workers using consistent hashing, meaning that for a given similarity group there is a consistent worker IP location where the similarity group can be found, and assigns each worker a corresponding partition range of hash values for which the worker is responsible. When the master receives an event, it persistently maintains the state corresponding to each partition assigned to the workers, and adjusts partition ranges as needed. The master may maintain a table, as in the configuration store, that maps similarity group identifiers (hash values) to workers based upon the partitions assigned to the workers. The backend nodes may periodically query the master table to remain current so that the backend nodes know which workers to communicate with. Each backend node may also maintain a local copy 220 of the table.

All nodes in the system are created by and run in the Kubernetes orchestration layer which can determine whether to add or remove nodes based upon instructions or custom metrics provided by users. As noted above, the invention scales workers based upon demand in order to maintain fast response and meet performance requirements. In accordance with the invention, the Kubernetes orchestration layer is provided a custom metric which measures and compares the demand on a worker to predetermined threshold limits. When the demand reaches a threshold limit, Kubernetes dynamically scales the number of nodes up or down based upon the demand, and informs the master so that the master can repartition the metadata range across the workers. When a backend node wishes to deduplicate an 8 MB slice of data, it calculates a similarity group identifier (ID) for the slice and queries the worker to which that similarity group is assigned by using the stored mapping table 220 that maps similarity groups to workers. In an embodiment, the mapping table may be updated and maintained current by the master as the mappings change due to repartitioning. Alternatively, the backend nodes may query the master for updates to the tables.

Figure 5:
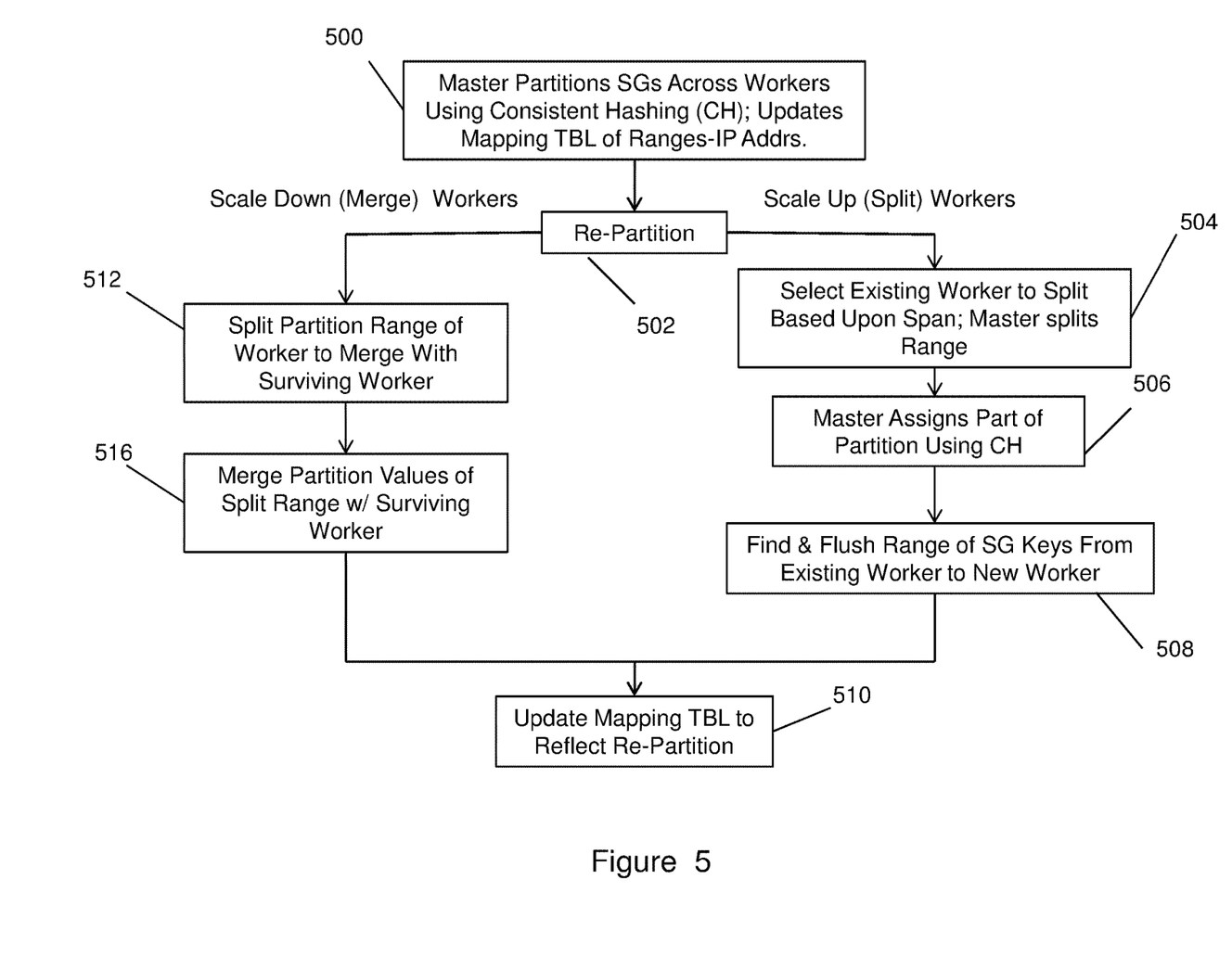
FIG. 5 is a flowchart illustrating an embodiment of a process in accordance with the invention in which the system scales worker nodes according to demand and the master node of the subsystem of FIG. 2 repartitions the metadata space across the scaled nodes.

In an embodiment, similarity groups may be identified by an unsigned four byte number in the range of zero to $2^{32}+1$ (approximately four billion—referred to herein as a range "[0, 4B]") which byte number serves as the hash value of the similarity group. To spread the work across workers, the master may partition the full range of identifiers into sub-ranges (partitions) and assign the partitions to the various workers using consistent hashing. With a single worker, the full range [0, 4B] is assigned to the single worker. As the number of worker nodes scales up (increases) through a node "split" in which new node is added, the master splits the partition range assigned to the original worker node and assigns the split part of the range to the added node. With multiple nodes, as the nodes scale down through a node merge in which a node is eliminated, the partition ranges assigned to two nodes are combined by the master at the merged node. Initially, the master may partition the [0, 4B] range of values across the workers by reassigning different non-overlapping sub-ranges of the full partition to the workers. Each worker will be assigned a [low, high] range of values. In an embodiment, the master may partition ranges in half. When a single node which was assigned the full range of [0, 4B] splits to add a second node, a first node of the two nodes may be assigned half of the full range, i.e., a partition range of [0, 2B] and the second node will be assigned the remaining half. i.e., a range [2B+1, 4B]. In general, to select a node of the plurality of nodes to split, the invention may select a node based upon a weight corresponding to the span of each node such that nodes with larger spans are more likely to be split first. An advantage to this approach is that it simplifies the splitting and coding to track partition ranges with a start value and an end value. This process of scaling and partitioning is illustrated in FIG. 5 and will be further described below. As an alternative to splitting ranges in half, another approach which may be used is to divide the [0, 4B] range into a number of stripes, 1 million, for example, and assign each node some number of stripes, which may be, but are not necessarily, consecutive. This alternative approach has the potential advantage of reducing hot spots because the ranges are divided more finely and are distributed, but it is more complex to implement.

When scaling down the number of nodes (because of reduced demand), the invention may merge a worker node being removed with a neighbor node that has consecutive values to those of the node being removed, preferably the next lower set of values, although merging to the next higher set of values is also acceptable. As an example, if there are three nodes having partition ranges of [0, 2B], [2B+1, 3B] and [3B+1, 4B], respectively, and the third node with partition range [3B+1, 4B] is removed, it may be merged with the second node having the range [2B+1, 3B] and the range of the resulting merged node set to be [2B+1, 4B].

Figure 3A:
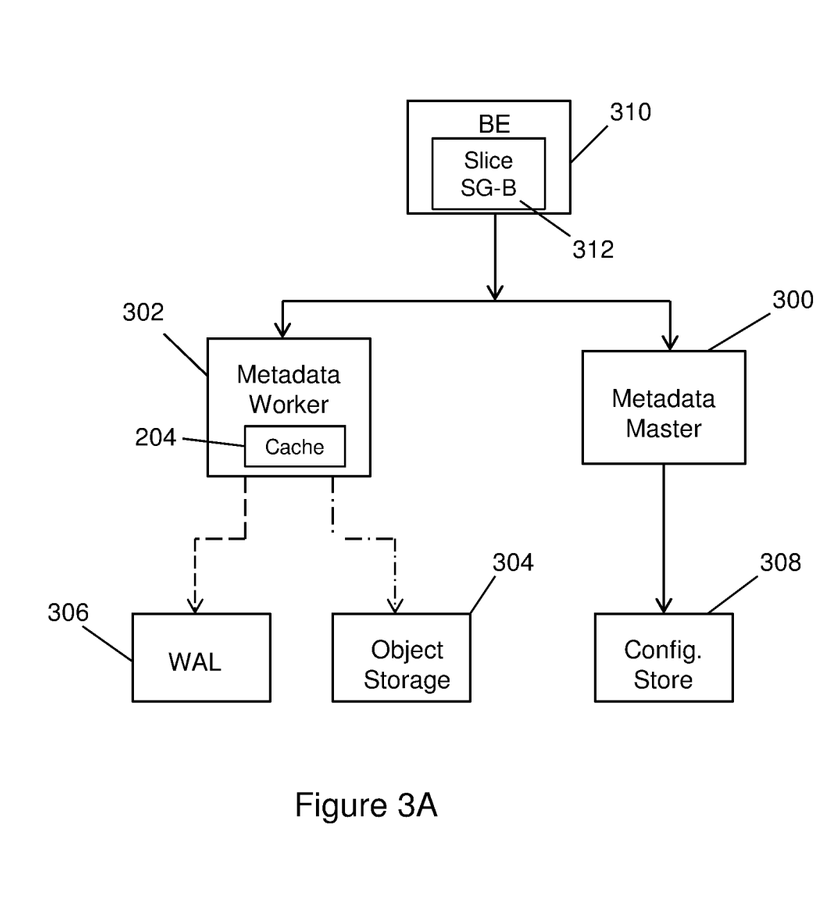
FIG. 3A is a functional block diagram of the metadata microservices subsystem of FIG. 2 configured to have one metadata worker node.

FIGS. 3A-4B illustrates scaling of worker nodes and the assignment of partition ranges using consistent hashing, which as previously described means there is a consistent IP location of a worker where a given range of hash values for a similarity group can be located. FIG. 3A is a functional block diagram similar to FIG. 2 of the metadata microservice subsystem 120 at a time when it has a single metadata worker node 302 and a master node 300. The worker node may be connected to an object store 304 and to a WAL 306, and the master node may be connected to a configuration store 308. The object store 304, the WAL 306 and the configuration store 308 may be similar in operation and function to corresponding elements 206, 102 and 208, respectively, of FIG. 2. A backend node 310 may connect to and communicate with the subsystem comprising the networked metadata master 300 and the metadata worker 302.

Figure 3B:
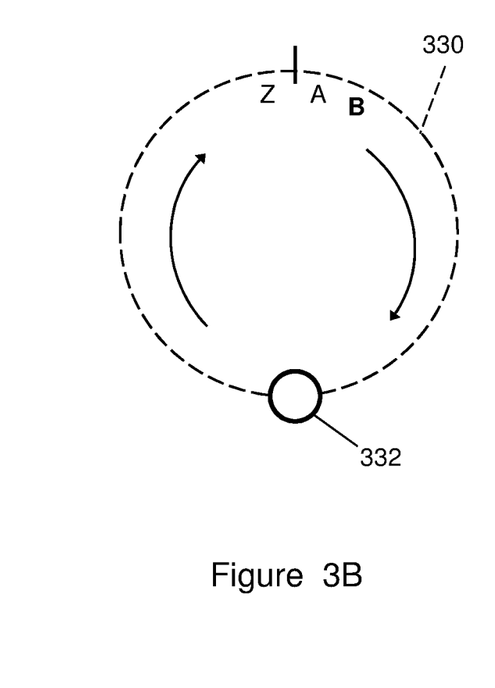
FIG. 3B is a diagrammatic view illustrating the mapping of a similarity group hash value to IP location within the metadata range for the subsystem of FIG. 3A in accordance with consistent hashing.

FIG. 3B is a diagrammatic view of a node ring 330 for the system shown in FIG. 3A that conceptually illustrates consistent hashing. The node ring represents the full similarity group range of values [0, 4B], which, for purposes of explanation, is shown as being divided into locations A-Z, where each location corresponds to a range of values within the full range. The full range is assigned by the master to the single worker 302 which is shown located at 332 on the node ring 330 at the center of the full range. Assuming, for the example shown in FIGS. 3A-3B, that the backend node 310 has received a slice 312 to deduplicate, and has computed a similarity group (SG) identifier value B for the slice, FIG. 3B shows the similarity group B located on the node ring 330 (which depicts the full range of values assigned to the single worker 302) at approximately a 2 o'clock position based upon its ID value. Thus, the backend node will query worker 302 to deduplicate the slice.

Figure 4A:
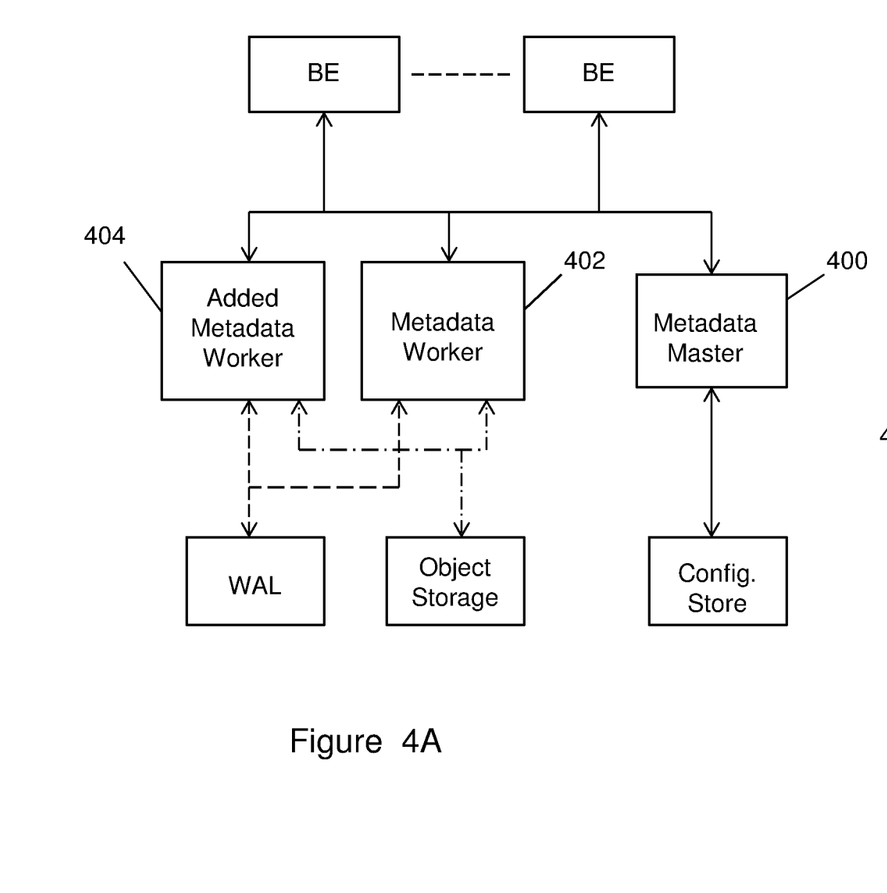
FIG. 4A is a functional block diagram showing the worker node of the subsystem of FIG. 3 scaled up to add an additional worker node.
Figure 4B:
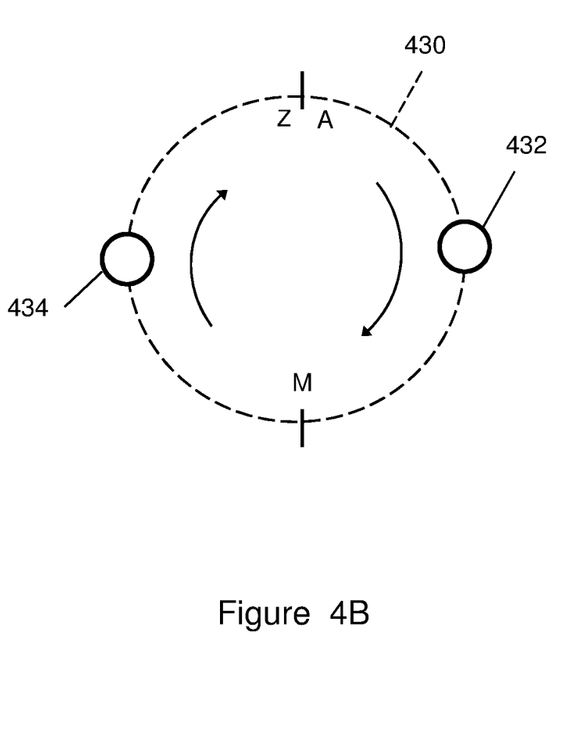
FIG. 4B is a diagrammatic view illustrating the repartitioning of the metadata space for the additional added node shown in FIG. 4A.

FIG. 4A illustrates scaling of the system of FIG. 3A to add an additional node. Referring to the Figure, assume that the invention scales the worker 402 to add an additional worker node, the master 400 will repartition the full range to assign half of the range [0, 2B] to worker 402 and the other half [2B+1, 4B] to worker 404. This is illustrated on the node ring 430 in FIG. 4B where 432 represents the first worker 402 and 434 represents the newly added worker 404. When a backend node wishes to query the workers about a similarity group, it will issue the query to the worker that is assigned the partition range which encompasses the similarity group's ID value.

Part of the master's function is to receive events, persistently maintain state corresponding to each partition assigned to workers, and adjust partition ranges accordingly. When the event is a scaleup event, the master splits a selected worker node's partition range in half to scale up workers, reassigns partition ranges, and informs the node to flush the similarity groups outside of its new partition range to object storage so that they will be in a consistent state for the new worker to begin servicing. Similarly, when the event is a scale down event to merge nodes to remove a worker, the master will inform the worker being removed to flush its state to object storage, and then check back to determine whether the worker node being removed has completed flushing its state to object storage. If it has not, the master may complete the flushing task. The master may select a worker with an adjoining partition range for the merge, and inform the worker to begin servicing the larger range spanning its previous partition range and the partition range of the worker being removed.

When the event is a crash, the master is informed that a worker has crashed. The master records the state of the worker. When the crashed worker is restarted (by Kubernetes), it may communicate with the master to obtain its previous partition range and its previous WAL name to use in recovery, as will be described. States may include: Active, Unassigned, Pending, Exiting, and FlushComplete. Active workers are those serving their assigned partition ranges. Unassigned workers are those that have started up from a scale up event and are awaiting assignment of a partition range by the master. During a scaleup event, a worker that is having its partition range split is in the Pending state until it finishes flushing similarity groups outside of its new range. Exiting workers are nodes that have been scaled down, but their partition range has not yet been assigned to a current worker. FlushComplete is an intermediate state for a worker which has had its log flushed by the master. After the worker node's range is reassigned, the worker node's record may be removed.

The master node additionally implements a crash recovery policy to return a cluster to a consistent state after the master node restarts. For persistence, the master node preferably uses a key-value store provided by the etcd store to record state information although object storage. Alternatively, a log file may be used. Etcd has the advantage of low latency, although it has limited capacity and scaling capabilities.

When an event occurs, the master may record information about worker nodes in the key-value object store. The records may include for each worker, its partition start and end values, the name of its log, its IP address, and other information. If the master crashes, Kubernetes will restart it, and the master node can read from etcd and construct a list of structures representing the states of the workers. The master may then check with the worker nodes on the list to determine its status. The master may communicate with each worker on the list to determine whether it is online, in an active state, and serving its specified partition range. If a worker does not respond, or if it has the wrong state or wrong range, the master may merge partition ranges and update workers to return the cluster of workers to a stable state and to ensure that they are covering the full partition range. If a worker is missing, it may be treated in a similar manner to a scale down event including replaying logs for missing workers.

FIG. 5 is a flow chart showing an embodiment of a process in accordance with the invention by which workers scale based upon demand, and the master repartitions similarity group value ranges to workers. At 500, the master may initially partition similarity groups across workers using consistent hashing and update a mapping table of the master that maps similarity group identity to workers by IP address. At 502 the master may be informed of a split or a merge and the need to repartition ranges across workers using consistent hashing and update the mapping table of ranges to IP addresses following repartitioning. When Kubernetes scales up and adds a new worker, at 504 the master splits that original worker's partition range. As previously described, the worker to split may be selected by Kubernetes based upon span. At 506, the master assigns part of the split partition range to the new worker using consistent hashing. At 508, the master causes the worker being split to adjust its supported partition range and to flush the similarity group keys for the partition being split off to the new worker. When flushing is complete, at 510 the master updates the mapping table to reflect the re-partitioning and the master alerts the new worker to begin serving its partition range. If a backend node queries the old worker for a similarity group outside of its range, the old worker may respond with an out-of-range error, as will be described below in connection with FIG. 6. Likewise, if a backend queries the new worker before it is ready, the new worker may respond with busy-retry error, and the backend node will wait for a selected period of time and retry.

To scale down two workers and merge their partitions, at 502 Kubernetes may select a worker being eliminated. At 512, the master selects the partition range of the worker being eliminated, and at 516 merges the partition values from the worker being eliminated to the surviving worker by causing the worker being eliminated to flush the similarity group keys to the surviving worker, in a similar manner to that described for splitting a partition to a new worker. At 510 the master updates the mapping table to reflect the re-partitioning.

Figure 6:
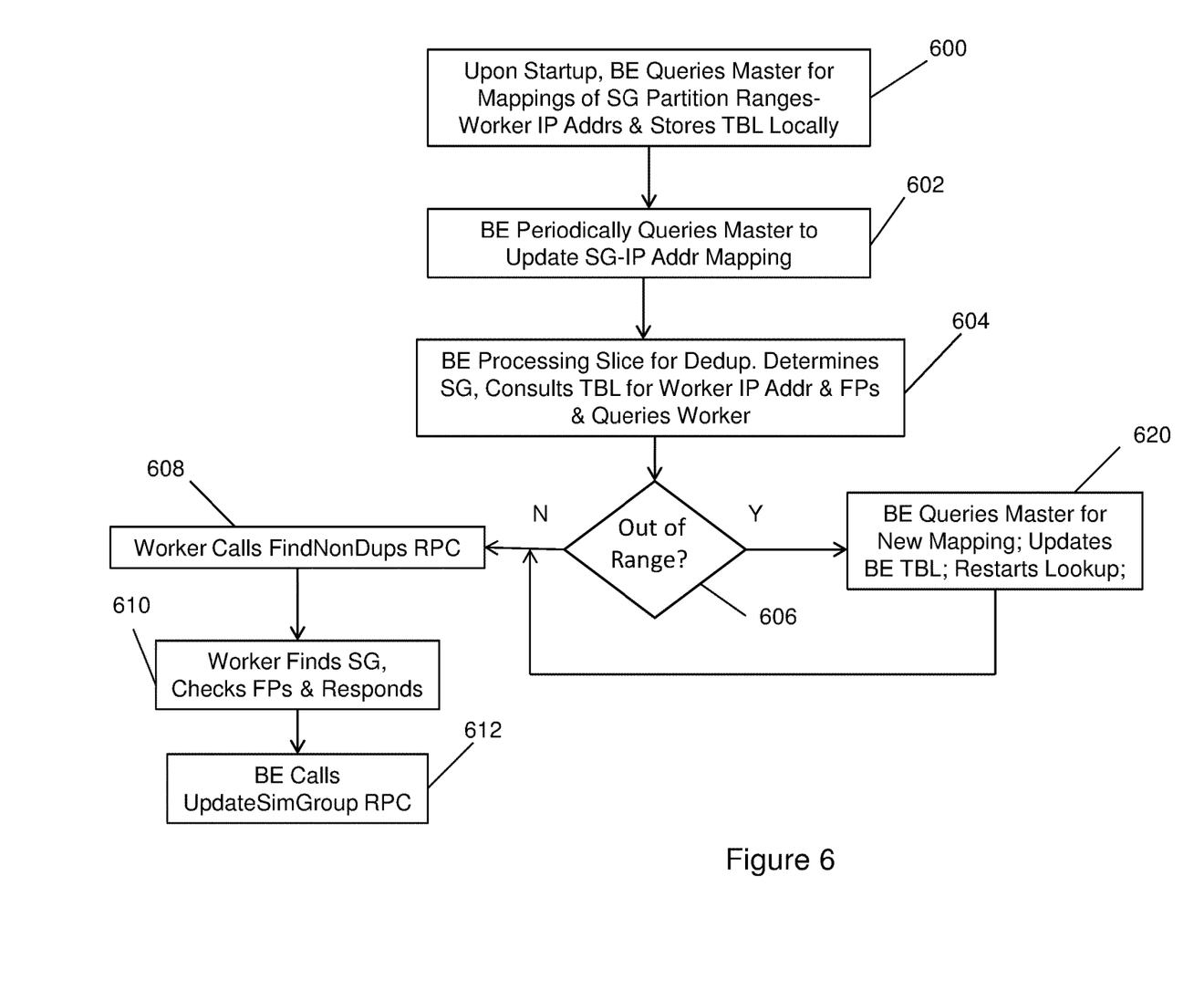
FIG. 6 is flow chart illustrating an embodiment of a process in accordance with the invention in which the master node of the metadata microservices subsystem of FIG. 2 coordinates changes within the worker node cluster of the deduplicated storage system.

As noted previously, worker nodes are responsible for managing access to similarity groups for deduplication and for restoring objects, the master node coordinates changes within the worker node cluster, and the backend nodes query workers for deduplication or restoration of a similarity group. FIG. 6 is flow chart showing an embodiment of a process in accordance with the invention by which the system performs deduplication. As shown, at 600 and also referring to FIG. 2, upon startup the backend nodes 216 may query the master node 200 for mappings of similarity group partition ranges to workers' IP addresses, and store the mappings in local tables 220. In one embodiment, at 602 the backend nodes may periodically query the master for changes to the mappings and update the local tables. Alternatively, in another embodiment the master may automatically send updates to the backend nodes when the mappings change due to repartitioning.

Figure 7A:
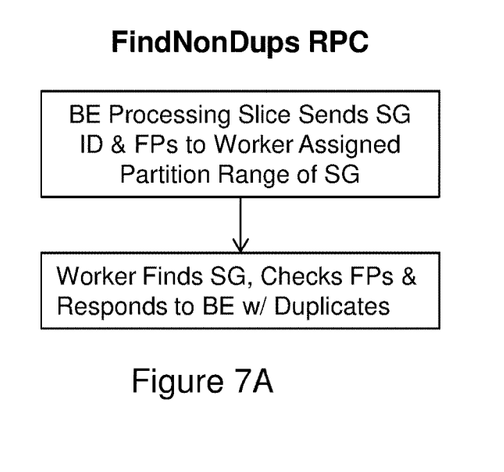
FIG. 7A is a flowchart illustrating a FindNonDups remote procedure call in accordance with the invention.
Figure 7B:
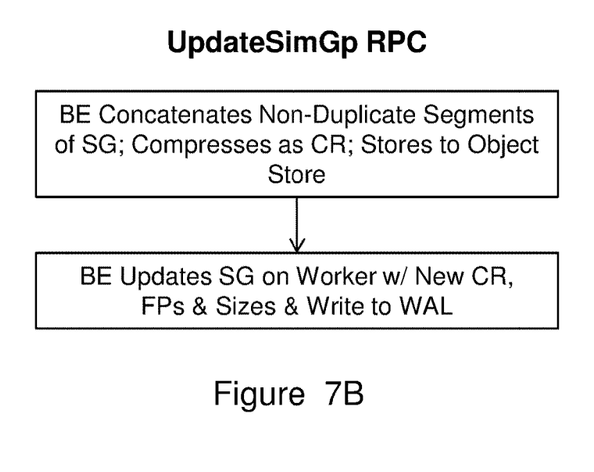
FIG. 7B is a flowchart illustrating an UpdateSimGp remote procedure call in accordance with the invention

At 604, a backend node processing a data slice for deduplication determines the similarity group identifier. It may then consult its internal table for a mapping to the address of the worker to which the partition range covering that similarity group is assigned, and send the identifier and a list of fingerprints and segment sizes to the worker. At 606, the worker receiving the query determines whether the identifier is in or out of its assigned partition range. If the identifier is not out of range, at 608 the worker may call a FindNonDups RPC (an example of a suitable one being illustrated in FIG. 7A) that finds the similarity group, compare the supplied list of fingerprints to the specified similarity group, and respond at 610 to the backend node with an indication of those fingerprints that that are unique (non-duplicates). After deduplicating a slice, at 612 the backend node may call an RPC process UpdateSimGroup that concatenates non-duplicate segments, compresses the concatenated segments to form a new compression region, stores the compression region in object storage, and updates the similarity group on the worker with the new compression region and list of fingerprints and segment sizes. FIG. 7B is a block diagram illustrating an UpdateSimGroup RPC process in accordance with an embodiment of the invention.

If, instead, at 606 the identifier is out of range, at 620 the worker responds with this to the backend node which may query the master to receive a new mapping update to its table. The backend node may then issue a query to the new worker which restarts the fingerprint lookup at the new worker, and the process moves to step 608 and proceeds as described above. Because worker scaling is dynamic, at either of steps 608 or 612 the worker may respond to an RPC call with an "out-of-range" error. In such a case, the process would return to step 606 and 608 to query the master and restart the call. Similarly, any other RPC call from a backend node to a worker could result in an out-of range error, in which case, the master would be queried for an updated partition mapping and the call repeated based upon the updated mapping.

Figure 7C:
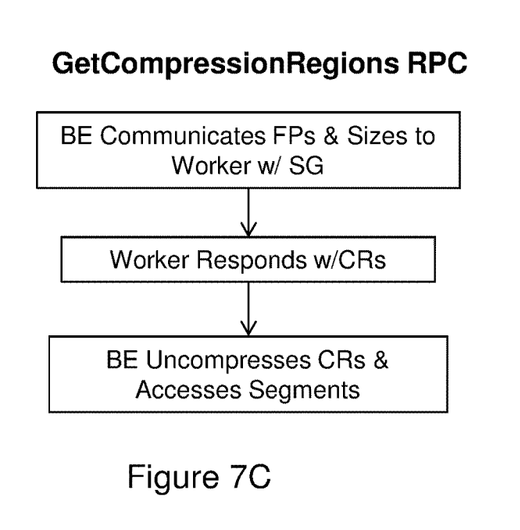
FIG. 7C is a flowchart illustrating a GetCompression Regions remote procedure call in accordance with the invention.

If a client or other internal system process wishes to access a client-written object, a backend node may communicate with the appropriate worker to find the segments. The client may provide a similarity group identifier and list of fingerprints and sizes to the worker, which may determine the compression regions that contain the fingerprints within the similarity group and respond with a list of the compression region names. A backend node may access and uncompress the compression regions to access the segments. FIG. 7C is a block diagram of a GetCompressionRegions RPC process for accomplishing this in accordance with an embodiment of the invention.

Figure 7D:
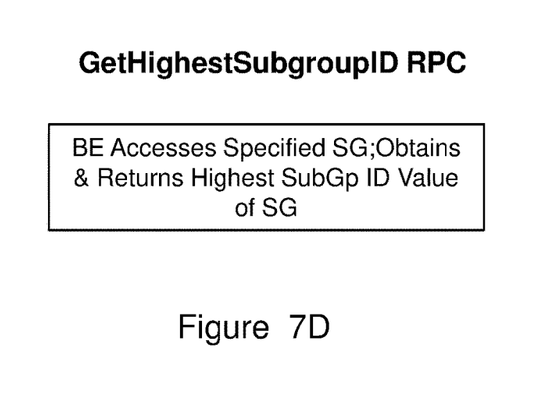
FIG. 7D is a flowchart illustrating a GetHighestSubgroupID remote procedure call in accordance with the invention.

To control the sizes of similarity groups so that they do not become too large to fit in memory, or take too long to read from or write to object storage, the invention may limit their size as, for instance, to approximately 8 MB as previously described. Since other incoming slices may map to the same similarity group, when a similarity group exceeds a preselected threshold size, it may be split to form a subgroup. A similarity group may have multiple subgroups, and each may have a subgroup ID based upon the number of times the similarity group has reached the threshold and been split. Also, since it is necessary to persist all changes to similarity groups, a similarity group may also have a transaction ID that is incremented each time the similarity group is updated. Therefore, before calling the FindNonDups RPC, a backend node may first call a GetHighestSubGroupID RPC to obtain the highest subgroup ID for the similarity group. FIG. 7D illustrates an embodiment in accordance with the invention of a suitable GetHighestSubGroupID RPC for this purpose.

For fast response, workers preferably have an in-memory cache 204 (FIG. 2) as previously described. Upon receiving a request, a worker may first consult its in-memory cache for the corresponding similarity group. If the cache does not hold the similarity group, the worker may read the similarity group from object storage and add the similarity group to its cache. The worker can obtain from object storage a list of all similarity groups that begin with the ID prefix of the desired similarity group, and select the one with the highest subgroup ID and the highest transaction ID to read into cache since it will be the most current.

Read/Write Cache

The in-memory read/write (R/W) cache of a worker provides high speed, low latency access to similarity groups, low cost, reliable volatile storage of similarity groups, and maximizes memory usage. Therefore, it is desirable to maximize the cache hit rate. A worker accesses a similarity group both for deduplication and for finding the location of segments for restoring an object, respectively referred to herein as a write path and a read path. Previously this required both a write cache and a separate read cache each having predefined memory allocations. Because it is difficult to predict whether reads or writes will occur and how to allocate memory to the two different cases, having separate caches with their own fixed memory allocations is wasteful of resources and inefficient. Accordingly, the invention provides a single physical in-memory read/write cache that is used for both reading and writing.

A read/write cache in accordance with the invention may comprise a preselected fixed size allocation of physical memory of a worker that is used for holding similarity group information both for deduplication and for restoration following a crash. One portion of the memory allocation may be used as a write cache and the remaining portion of the memory may be used as a read cache, and the sizes of the allocated read and write portions can vary dynamically within the preselected fixed allocation of memory as needed based upon demand. An embodiment of a read/write cache in accordance with the invention is illustrated diagrammatically in FIG. 8A.

Figure 8A:
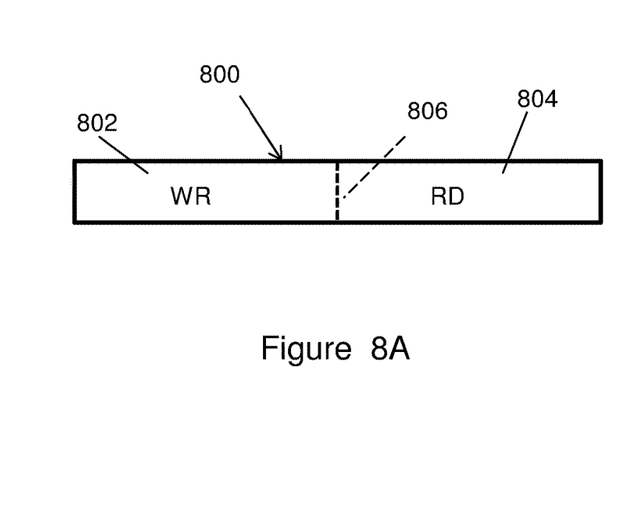
FIG. 8A is a diagrammatic view of a read/write cache memory structure in accordance with the invention.

As shown conceptually in FIG. 8A, a read/write cache in accordance with the invention may comprise a memory structure 800 comprising a preselected fixed allocation of memory that is divided into two parts which may dynamically vary in size according to demand within the read/write cache. One part 802 may comprise a portion of the memory allocation that is allocated for write entries, i.e., a write cache, and a second part 804 comprises the remaining portion of the memory allocation that is allocated for read entries, i.e., a read cache. When write entries outnumber read entries, the amount of memory allocated to the write cache 802 may increase as needed to accommodate the write entries, and the amount of memory allocated to the read cache 804 will decrease by a corresponding amount to maintain the total memory allocation constant. In this situation, the imaginary dividing line 806 in the figure between the two caches will move to the right conceptually.

The read/write cache in accordance with the invention in effect comprises a virtual read cache and a virtual write cache, in which entries are distinguished based upon the key associated with each entry. Keys are based upon the name (IDs) of a similarity group, and are different for read entries and write entries. The cache is preferably implemented with a Get function that queries the cache with a key and returns an exact match. The full name of a similarity group of an object may have multiple components, i.e., a deduplication domain ID ("DDID"), a reserved keyword (e.g., "SG"), a similarity group ID ("SGID"), a similarity subgroup ID ("SubID") and a transaction ID number.

For deduplication, a backend node computes a similarity group identifier for a slice of data and queries the appropriate metadata worker to perform deduplication against that similarity group. In accordance with the invention, the cache finds the write entry for the requested similarity group that has the highest subgroup ID (latest version). Accordingly, write entries are written into the write cache with the similarity group ID, but not with the subgroup or transaction IDs as part of the key for the cache entry. Write cache entries will be those having the highest subgroup ID and the highest transaction ID. Accordingly, write queries to the cache form a key based upon the similarity group ID, as, e.g., "(DDID#SG#SGID)". In contrast, for reading back segments for restore purposes, it is necessary to access both the similarity group and the subgroup that was recorded in a slice recipe's representation in storage. This is the specific similarity group and subgroup referenced when performing deduplication on the write path. Therefore, keys for read entries to the cache are formed using both the similarity group ID and a subgroup ID, e.g., "(DDID#SG#SGID#SubID)", and, in accordance with the invention, the matching entry with the highest transaction ID is returned.

When the in-memory cache becomes full, it is necessary to evict a cache entry. There are different ways to do this, but a least-recently used (LRU) eviction algorithm is one that may be used to evict an entry. When evicting entries from the cache, read entries need not be written to object storage because they are unchanged from the version in object storage. Write cache entries are periodically written to object storage for persistence, and their state may be tracked with an IsModified flag that is set to true when a similarity group is updated and set to false when it is written to object storage. To prevent cache insertions from blocking on evictions that have to be written to object storage, which may require as much time as 100 ms, for example, the cache may have a separate eviction thread that maintains a threshold amount of free space in the cache. The cache may utilize low and high watermarks to determine when to evict an entry. When the cache utilization grows to the high watermark, the eviction thread evicts entries to lower cache utilization to the low watermark.

Figure 8B:
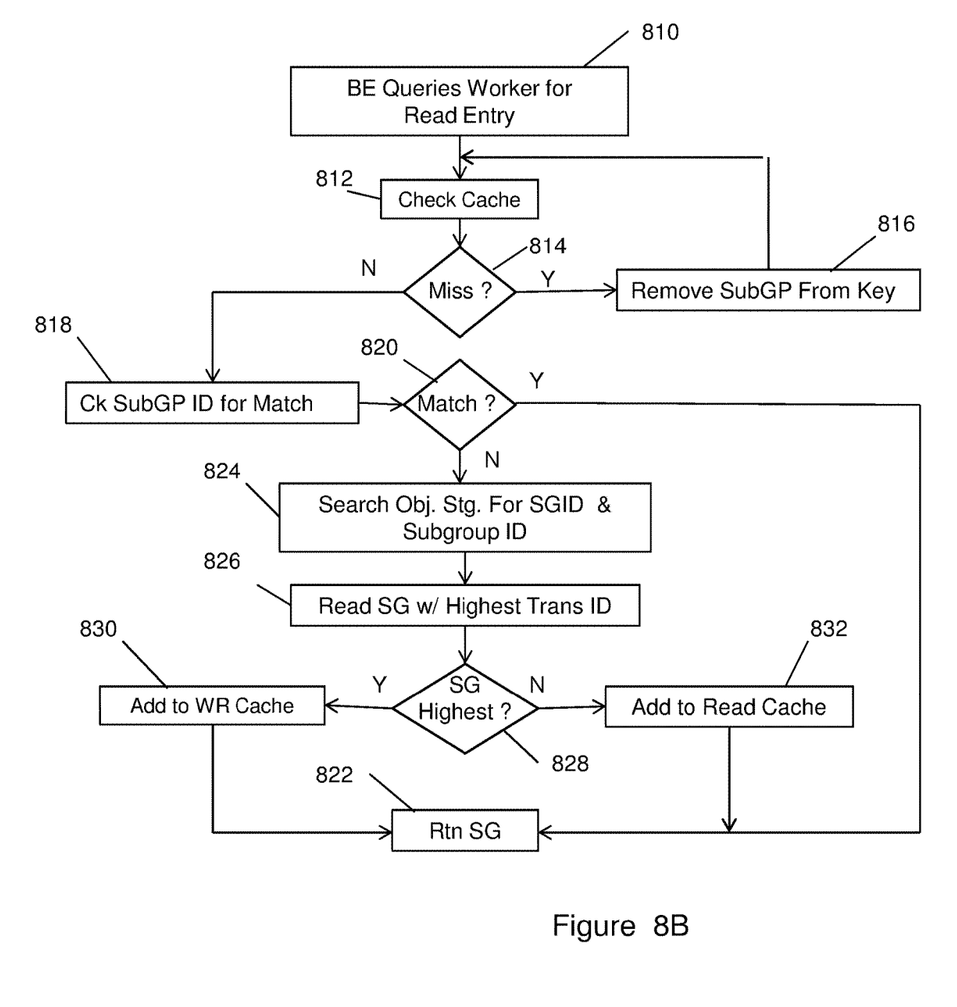
FIG. 8B is a flowchart of a process illustrating the operation of a read/write cache of FIG. 8A for read entries.
Figure 8C:
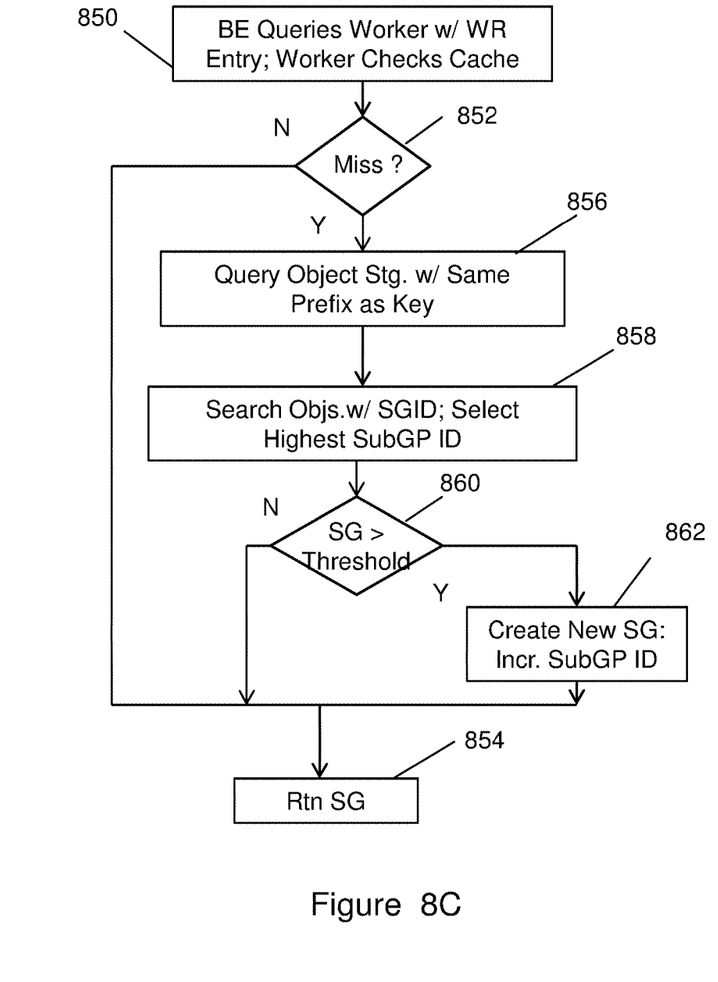
FIG. 8C a flowchart of a process illustrating the operation of a read/write cache of FIG. 8A for write entries.

FIGS. 8B and 8C are functional block diagrams that illustrate embodiments of cache operating processes in accordance with the invention for read entries and for write entries, respectively. The two processes are somewhat different.

Referring to FIG. 8B for a read entry, at 810 a backend node may query a worker with a read entry key, which includes both a similarity group ID and a subgroup ID, as described above. At 812, the worker checks its cache. If at 814 there is a cache miss, it is possible that the desired similarity group and subgroup are in the write cache, so at 816 the worker modifies the key by removing the subgroup identifier and returns to 812 to recheck the cache. If there is a result (no miss at 814), at 818 the subgroup ID, which is embedded in the similarity group structure is checked. If there is a match at 820, the similarity group is returned at 822. Otherwise, the similarity group should be in object storage, which is searched at 824 using the similarity group ID and subgroup ID. If the desired similarity group is not in the list from object storage, it is a data loss situation. Otherwise, at 826 the similarity group with the highest transaction ID can be read from object storage. If, at 828, the similarity group read is the highest subgroup, it is added at 830 to the write cache. Otherwise it is added to the read cache at 832. In either case, the similarity group is returned at 822.

Referring to FIG. 8C for a write entry, at 850, when a backend node queries a worker with a write entry key, which includes only the similarity group ID, the worker checks its cache. If at 852 there is a hit (no miss), the worker returns the matching similarity group at 854, since the write cache will always contain the highest subgroup ID. Otherwise, at 856 the worker queries the object storage with the same prefix as the key. At 858, all objects with the corresponding similarity group ID are searched and the object with the largest subgroup ID is selected. If at 860 the similarity group is larger than a preselected threshold, at 862 a new similarity group is generated and its subgroup ID is incremented instead of reading the previous version from storage, and the new similarity group is returned at 854.

As may be appreciated, the combined read/write cache in accordance with the invention has the advantage of dynamically allocating space to either read or write entries upon demand without wasting memory space by artificially sizing the read and write caches. In order to guarantee a minimum throughput for quality of service purposes, quotas may be established for read and write entries so that each type has a guaranteed minimum. Additionally, quotas could also be implemented per client, if desired, so that client throughputs are above a minimum threshold.

Write-Ahead Log (WAL)

Fast access to metadata is important to deduplication. It is important in a distributed deduplication metadata system to support fast incremental metadata updates that have high performance, low cost, persistence and crash resiliency. Workers must access similarity groups to respond to metadata queries. Because of their huge numbers and sizes, all similarity groups will not fit into memory, and reading similarity groups from object storage is unacceptably slow and costly. While block storage is faster, it has higher costs and lower reliability. Although workers may cache some similarity groups in memory, as described above, memory is volatile and updates must be persisted to prevent data loss. Moreover, when a backend processing node concatenates segments having unique fingerprints into a compression region and stores the compression region in object storage, it updates the worker so that the similarity group references the new compression region and its fingerprints. This is an in-memory update to the cache of the worker. There is a risk that should the worker crash or be scaled down, the update would be lost which would cause a data loss because the client's data relies on similarity groups for restore operations.

The invention addresses these issues by inserting updates into a write-ahead log (WAL) before responding to the backend node. WALs may be created by the master using an AWS service such as Kinesis. Insertions into the WAL are quick, low cost, persistent and crash resilient. WALs also support multiple threads inserting updates concurrently while maintaining log consistency.

In the event that a worker crashes and restarts, it replays its WAL and applies the updates to its similarity groups. Because this may be too time-consuming for a desired response time, in an embodiment, the invention prevents the WAL from becoming too large so that it can be read back quickly using an approach analogous to check-pointing. However, because AWS Kinesis does not support check-pointing, the system may instead periodically, e.g., every several minutes, write the modified similarity groups to object storage in an operation referred to as flushing the log. After a flush has completed, the WAL can be deleted, and a new empty WAL created. This effectively limits the size of the WAL while affording the desired fast response and persistence.

Figure 9:
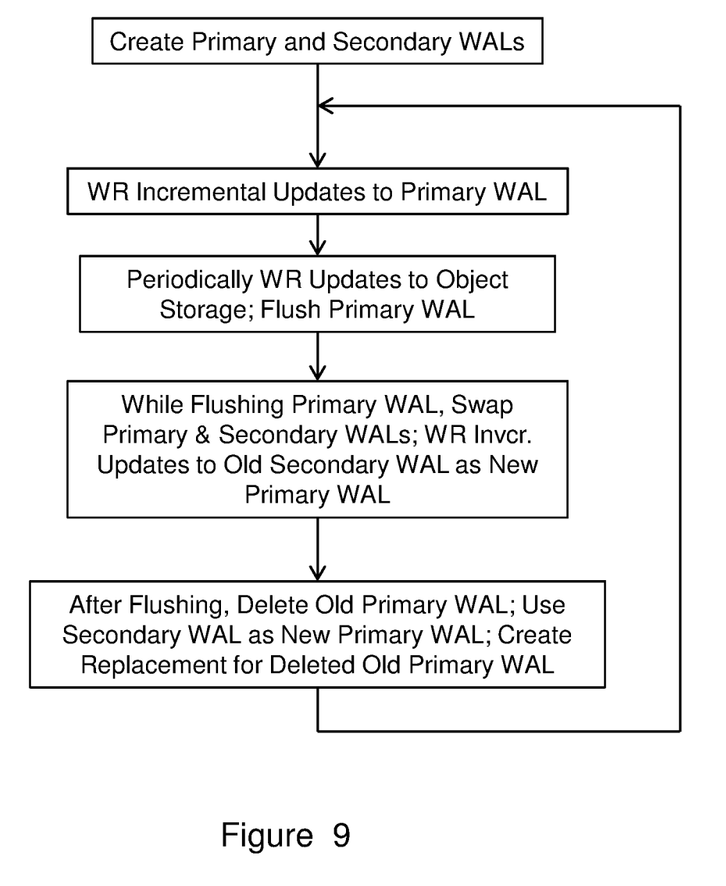
FIG. 9 is a flowchart of a process illustrating the operation of a write-ahead log in accordance with the invention.

It is important that the worker be able to continue handling queries and updates during the flushing operation. Accordingly, instead of trying to write to the WAL that is being deleted, in accordance with the invention, the master may create a secondary WAL that is used by the worker during flushing of the primary WAL. During flushing the primary and secondary WALs are swapped so that the secondary WAL becomes the new primary WAL and stores incremental updates while the old primary WAL represents the state being flushed. This cycle is then repeated. FIG. 9 is a flowchart illustrating this process. An alternative approach that may be used is to create and name WALs incrementally, where a new WAL that has an ID that is larger than the old one is created to receive updates. After flushing, the older WAL would be deleted.

When a metadata worker restarts following a crash, it is returned to its previous state by replaying its WAL, as stated. Some of the updates to similarity groups may have already been persisted to object storage, while other updates may only exist in the WAL. For each record in the WAL, the corresponding similarity group is accessed, and the update is applied. If the similarity group already has the update (for example, because of a previous recovery event), it is unnecessary to apply the update again. Once all similarity groups have been updated and flushed to object storage, it is safe to delete the WAL and recreate it in an empty state. Recovery can also be handled by other nodes. For example, during a scale down events, a worker attempts to flush its state and delete the WAL before being turned off. If it does not complete flushing before being turned off, the master may recover the worker's WAL and return similarity groups to a consistent state that can be serviced by another worker.

The deduplication microservice is intended for high parallelism, where many clients can read/write objects simultaneously. As such, it must handle multiple accesses in parallel to support throughput goals. As discussed above, each update to a similarity group results in an update to the WAL for persistence across crashes. Most WAL services (such as Kinesis and Kafka, for example) have a mechanism for increasing parallel performance. The WAL may use one or more shards (sequences of data records) to store updates, where a shard is equivalent to a file or an internal log. Increasing the number of shards increases the parallelism of WAL updates and overall throughput. The invention may adjust the number of shards allocated to a WAL based upon anticipated metadata load to meet a desired throughput and budget (there is a cost associated with each shard). After flushing a WAL and deleting it, the system may determine the number of shards that are needed before recreating a WAL.

Advantages to using multiple shards are that they can accelerate crash recovery, and scale down events and also require less frequent flushes. When a similarity group update is written to the WAL, the update is actually written to a single shard, where the shard assignment may be based on a key associated with the entry. In an embodiment, the system may create a relatively large number of shards (i.e., $100s$) and use a consistent key for a given similarity group so updates for a given similarity group will always go to the same shard. Then, when a worker begins the recovery process, it can track shards as they are recovered. If a backend node queries for a similarity group in a shard that has been already recovered, the in-memory cache or the object storage version of the similarity group will be up to date and may be used to satisfy the request. Otherwise, the worker may recover the needed shard to respond to the request. It is necessary to recover the full shard since an update to a similarity group could be anywhere in the shard, and the shard could have multiple updates for the similarity group. By using multiple shards, a metadata worker can respond more quickly to requests as shards are processed rather than waiting for the full WAL recovery. Multiple shards also permit flushing intervals to be extended since larger overall WAL sizes that are subdivided into shards may be used. Increasing the interval between flushing also reduces the number of writes to object storage because updates to a similarity group may be coalesced in memory before being written to object storage.

An alternative approach to swapping two WALs (primary and secondary) for a worker is to have one WAL per similarity group. All updates to a similarity group would then be written to the corresponding WAL for the similarity group. An advantage of this approach is that a similarity group with many updates could be flushed to object storage (and the WAL cleared) before a less frequently updated similarity group. Another advantage is that similarity groups become disconnected from workers. Thus, when a worker restarts from a crash or takes over serving similarity groups due to a scale up/down event, the worker can start responding to queries before fully recovering all WALs for similarity groups that are within its assigned partition range. If a queried similarity group has its own assigned WAL, then only that WAL needs to be recovered. Otherwise, the similarity group in object storage can be used directly without waiting for all WALs to be recovered. A disadvantage of this architecture is that Kinesis and other WAL services do not support a large number of WALs. If in the future these services begin supporting more WALs, this architecture would become more practical.

As may be appreciated from the foregoing description, the invention affords a deduplication microservices system and method having aspects that effectively address the problems of fast response, persistency, low cost and expandability.

While the foregoing description has been with respect to particular embodiments, it will be appreciated that changes to these embodiments may be made without departing from the principles of the invention, the scope of which is set forth in the appended claim.

The invention claimed is:

1. A method of handling data objects in a microservices-based deduplication system having a master node and one or more worker nodes connected as a network, each worker node having an assigned partition range of values that identify data similarity groups for which said each worker node is responsible, the method comprising:
receiving by a worker node a query related to an identified similarity group;
obtaining the similarity group from a cache of the worker node or, upon determining that the similarity group is not in the cache, obtaining the similarity group from object storage of said system; and
returning the obtained similarity group; and
wherein upon the query including fingerprints for segments of said identified similarity group and comprising a request to deduplicate the segments against previously stored segments, said method further comprises:
comparing the fingerprints with the fingerprints of previously stored segments to determine whether the received fingerprints are non-duplicates; and
updating the similarity group in the cache with a reference to a compression region of non-duplicate segments.

2. The method of claim 1, wherein said similarity group has a one or more subgroups created by updates to the similarity group, each subgroup having an increasing subgroup identity value that identifies the order in which the subgroup was created, and wherein said obtaining said similarity group comprises obtaining the subgroup having the latest update.

3. The method of claim 2 further comprising creating a subgroup of the similarity group upon a size of the similarity group increasing beyond a preselected threshold.

4. The method of claim 3, wherein said similarity group has a transaction identifier that is incremented each time the similarity group is updated, and said obtaining comprises obtaining the subgroup having the highest transaction identifier.

5. The method of claim 1 further comprising storing said compression region in said object storage, and said updating comprises updating the similarity group and a subgroup to reference said compression region.

6. The method of claim 1 further comprising writing incremental updates to similarity groups to a write-ahead log of said responsible worker node.

7. Then method of claim 6 further comprising periodically writing modified objects of said similarity group from said cache to object storage, and deleting said write-ahead log.

8. The method of claim 7, wherein said worker node has a second write-ahead log, and said writing incremental updates comprises writing updates to said secondary log during said flushing.

9. The method of claim 6 further comprising, upon said worker node crashing and restarting, communicating by the worker node with the master node to obtain the worker node's assigned partition range of values and write-ahead log identifier, and applying updates from said write-ahead log to bring assigned similarity groups up to date.

10. The method of claim 9 further comprising checking the version of similarity groups in object storage, and skipping said applying updates for similarity groups from said write-ahead log that have lower version identifiers.

11. The method of claim 1 further comprising adjusting said partition range of values assigned to said worker node by reassigning a portion of said partition range of values to another worker node, and flushing and evicting from said first-mentioned worker node similarity groups having values within said reassigned portion.

12. A computer program product comprising non-transitory computer readable storage medium embodying instructions for controlling a processor perform a method of deduplicating data in a microservices deduplication system having a master node and one or more worker nodes connected as a network, each worker node having an assigned partition range of values that identify data similarity groups for which said each worker node is responsible, the method comprising:
receiving by a worker node a query related to an identified similarity group;
obtaining the similarity group from a cache of the worker node or, upon determining that the similarity group is not in the cache, obtaining the similarity group from object storage of said deduplication system; and
returning the obtained similarity group; and
wherein upon the query including fingerprints for segments of said identified similarity group and comprising a request to deduplicate the segments against previously stored segments, said method further comprises:
comparing the fingerprints with the fingerprints of previously stored segments to determine whether the received fingerprints are non-duplicates; and
updating the similarity group in the cache with a reference to a compression region of non-duplicate segments.

13. The computer program product of claim 12, wherein said similarity group has a one or more subgroups created by updates to the similarity group, each subgroup having an increasing subgroup identity value that identifies the order in which the subgroup was created, and wherein said obtaining said similarity group comprises obtaining the subgroup having the latest update.

14. The computer program product of claim 13 further comprising creating a subgroup of a similarity group upon a size of the similarity group increasing beyond a preselected threshold.

15. The computer program product of claim 14, wherein said similarity group has a transaction identifier that is incremented each time the similarity group is updated, and said obtaining comprises obtaining the subgroup having the highest transaction identifier.

16. The computer program product of claim 13 further comprising storing said new compression region in said object storage, and said updating comprises updating the similarity group and a subgroup to reference said compression region.

17. The computer program product of claim 13 further comprising further comprising periodically writing modified objects of said similarity group from said cache to object storage, and deleting said write-ahead log.

18. The computer program product of claim 17, wherein said worker node has a second write-ahead log, and said writing incremental updates comprises writing updates to said secondary log during said flushing.

19. The computer program product of claim 17 further comprising, upon said worker node crashing and restarting, communicating by the worker node with the master node to obtain the worker node's assigned partition range of values and write-ahead log identifier, and applying updates from said write-ahead log to bring assigned similarity groups up to date.

20. The computer program product of claim 13 further comprising adjusting said partition range of values assigned to said worker node by reassigning a portion of said partition range of values to another worker node, and flushing and evicting from said first-mentioned worker node similarity groups having values within said reassigned portion.

* * * * *